(12) United States Patent
Thornton et al.

(10) Patent No.: US 7,720,461 B2
(45) Date of Patent: May 18, 2010

(54) MOBILE COMMUNICATIONS DEVICE WITH SECURITY FEATURES

(75) Inventors: David Thornton, Burgess Hill (GB); Neil Adams, Waterloo (CA); Herb Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1803 days.

(21) Appl. No.: 10/787,859

(22) Filed: Feb. 26, 2004

(65) Prior Publication Data

US 2005/0191988 A1 Sep. 1, 2005

(51) Int. Cl.
*H04B 1/38* (2006.01)

(52) U.S. Cl. .............. 455/410; 455/456.1; 455/411; 455/521; 455/115.1; 455/404.2; 370/354

(58) Field of Classification Search .......... 455/558, 455/412.2, 90.2, 456.1, 411, 521, 575.1, 455/115.1, 404.2; 340/574, 426.1, 359.18, 340/573.1, 506; 713/153; 370/354
See application file for complete search history.

(56) References Cited

U.S. PATENT DOCUMENTS

| | | | | |
|---|---|---|---|---|
| 5,715,522 | A * | 2/1998 | Vimpari et al. ............. 455/88 |
| 6,559,769 | B2 * | 5/2003 | Anthony et al. ............. 340/574 |
| 6,574,484 | B1 * | 6/2003 | Carley ....................... 455/521 |
| 6,763,226 | B1 * | 7/2004 | McZeal, Jr. ................ 455/90.2 |
| 6,873,261 | B2 * | 3/2005 | Anthony et al. ............. 340/574 |
| 7,058,409 | B2 * | 6/2006 | Hanninen et al. ........ 455/456.1 |
| 7,069,024 | B2 * | 6/2006 | Sharony .................. 455/456.1 |
| 7,151,922 | B2 * | 12/2006 | Sashihara et al. ........ 455/412.2 |
| 7,159,120 | B2 * | 1/2007 | Muratov et al. ............. 713/182 |
| 2002/0165008 | A1 * | 11/2002 | Sashihara et al. ........... 455/558 |
| 2003/0063004 | A1 * | 4/2003 | Anthony et al. ............. 340/574 |
| 2003/0137426 | A1 * | 7/2003 | Anthony et al. ............. 340/574 |
| 2004/0083215 | A1 * | 4/2004 | de Jong .......................... 707/7 |
| 2004/0130575 | A1 * | 7/2004 | Tai et al. ..................... 345/773 |
| 2004/0139163 | A1 * | 7/2004 | Adams et al. ............... 709/206 |
| 2004/0230807 | A1 * | 11/2004 | Baird et al. ................. 713/182 |
| 2005/0120225 | A1 | 6/2005 | Kirsch et al. |
| 2007/0198827 | A1 * | 8/2007 | Ono .......................... 713/153 |
| 2007/0298767 | A1 * | 12/2007 | Brown et al. ................ 455/411 |

FOREIGN PATENT DOCUMENTS

| | | |
|---|---|---|
| DE | 19836118 | 4/1999 |
| EP | 1 361 774 | 11/2003 |
| WO | 02-35491 A1 | 5/2002 |
| WO | WO 02/35491 | 5/2002 |
| WO | 03049471 | 6/2003 |
| WO | WO03049471 A1 | 6/2003 |

OTHER PUBLICATIONS

Communication pursuant to Article 96(2) EPC—issued by the European Patent Office- dated Oct. 11, 2006, paragraph 3.

* cited by examiner

*Primary Examiner*—Rafael Pérez-Gutiérrez
*Assistant Examiner*—Joseph Arevalo

(57) ABSTRACT

A mobile communications device for communicating with a wireless network. The device includes a processor, a communications sub-system connected to the processor for exchanging signals with the wireless network and with the processor, a user input device connected to the processor for sending user input signals to the processor in response to user inputs. A security module is associated with the processor for automatically taking a security action upon detecting a predetermined security user input through the user input device. The security action can include sending a duress message and/or wiping data stored on the device.

18 Claims, 4 Drawing Sheets

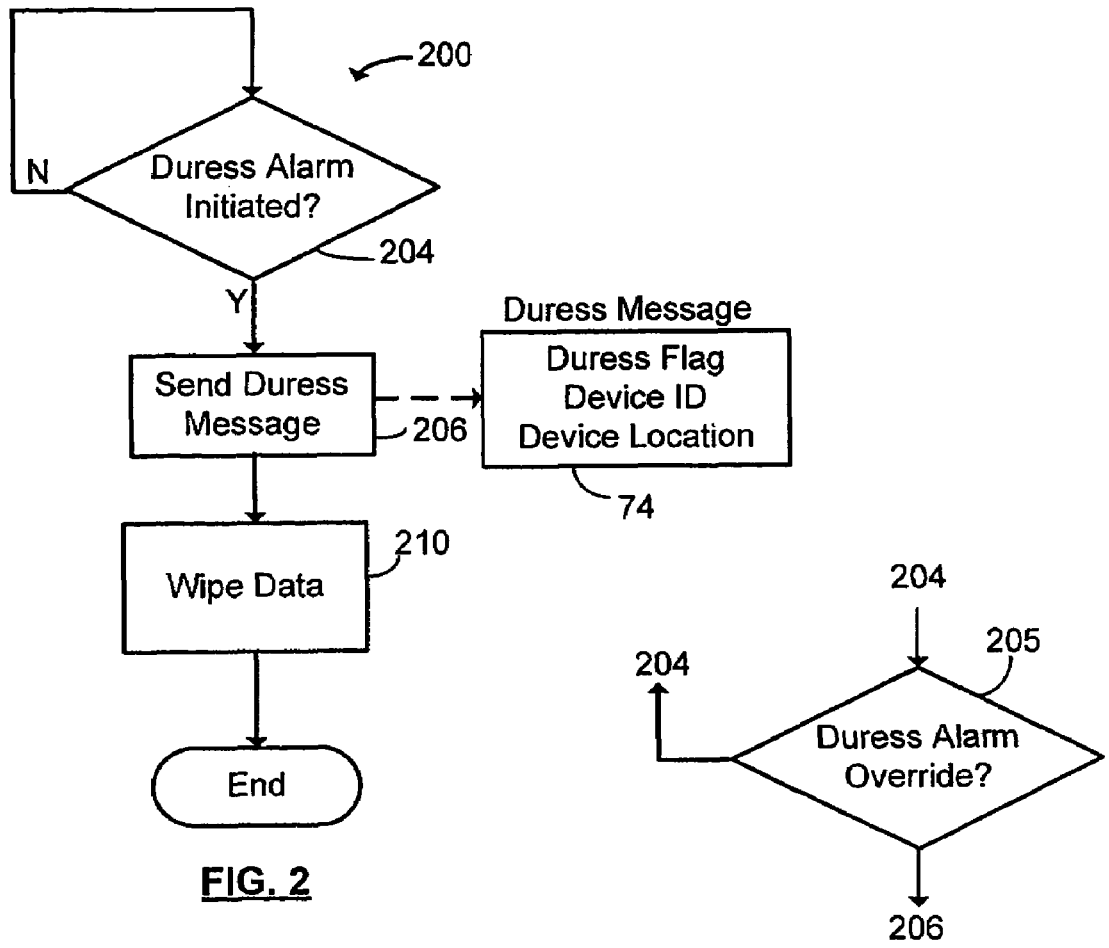
FIG. 2
FIG. 3
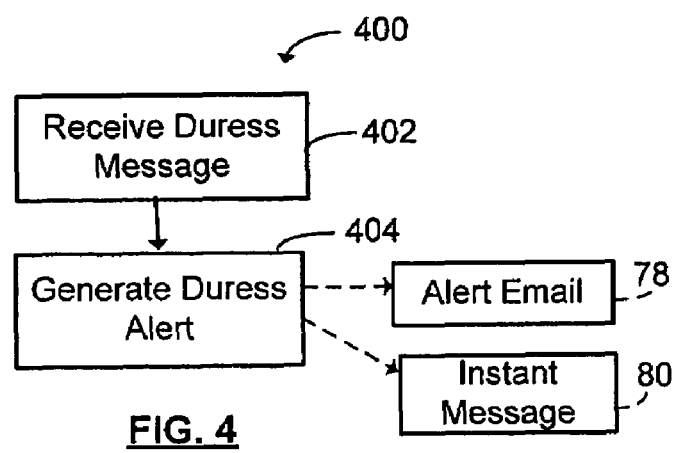
FIG. 4

US 7,720,461 B2

MOBILE COMMUNICATIONS DEVICE WITH SECURITY FEATURES

BACKGROUND OF THE INVENTION

The present invention relates to mobile communications devices.

Mobile communications devices can be carried into situations or locations where the security of the person carrying the device or the security of critical data stored on the device, or both, may be at risk. In the case of personal security, users of mobile telephone enabled devices can dial an emergency number such as 911 to communicate with an emergency dispatch operator to report a situation where he or she is at risk. Users of text messaging or email enabled devices have the option of sending a text message or email to a third party reporting the situation. However, such options may be of limited value when the user of the device is in a situation that requires a quick and discreet transmission of a duress signal.

In the case of critical data security, in some mobile communications networks, once it has been determined that critical data on a mobile device may be in danger a "kill packet" can be sent over the network to the mobile device instructing the device to wipe sensitive information from its memory. However, such a system requires that the system operator be informed of the danger in order to send the kill packet, and also that the mobile device be in communication with the network at the time that the kill packet is sent. Thus, such a system provides the opportunity for an unauthorized party to acquire a mobile device containing critical data and disable the device from communicating with the network to prevent the receipt of a kill packet. In some mobile communications devices, it is possible to cause application data on the device to be wiped by successively entering a password for the device incorrectly a predetermined number of times. Alternatively, data can be manually erased one record at a time. These are both cumbersome options if data must be removed from the device quickly. In some mobile devices, a device wipe can be initiated when the mobile device is docked with a desktop computer. However, this requires that a properly configured desktop be readily accessible.

Thus, improved security for the persons using mobile communications devices and for the data on such devices is desirable.

SUMMARY OF THE INVENTION

In order to provide security for user of a mobile device and data stored on the device, in various examples the mobile device is configured to transmit a duress message and/or wipe or encrypt data on its storage automatically when a user provides a predetermined security input to the device.

According to an example embodiment of the invention, there is provided a mobile communications device for communicating with a wireless network. The device includes a processor, a communications sub-system connected to the processor for exchanging signals with the wireless network and with the processor, a user input device connected to the processor for sending user input signals to the processor in response to user inputs. A security module is associated with the processor for automatically taking a security action upon detecting a predetermined security user input through the user input device.

According to another example embodiment of the invention is a method for providing security for a mobile communication device that is configured to communicate over a wireless communications network, including steps of: (a) monitoring for a predetermined user security action through a user input interface of the mobile communications device; and (b) automatically taking a security action at the mobile communications device upon detecting the predetermined user security action.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein:

FIG. 2 is a flow diagram of a security process taken at the mobile communications device according to embodiments of the invention;

FIG. 3 is shows a further sub-process of the process of FIG. 2 in according to an alternate example embodiment of the invention;

FIG. 4 is a flow diagram of a duress process taken when a duress message from a mobile device is received;

Like reference numerals are used throughout the Figures to denote similar elements and features.

DETAILED DESCRIPTION

Figure 1:
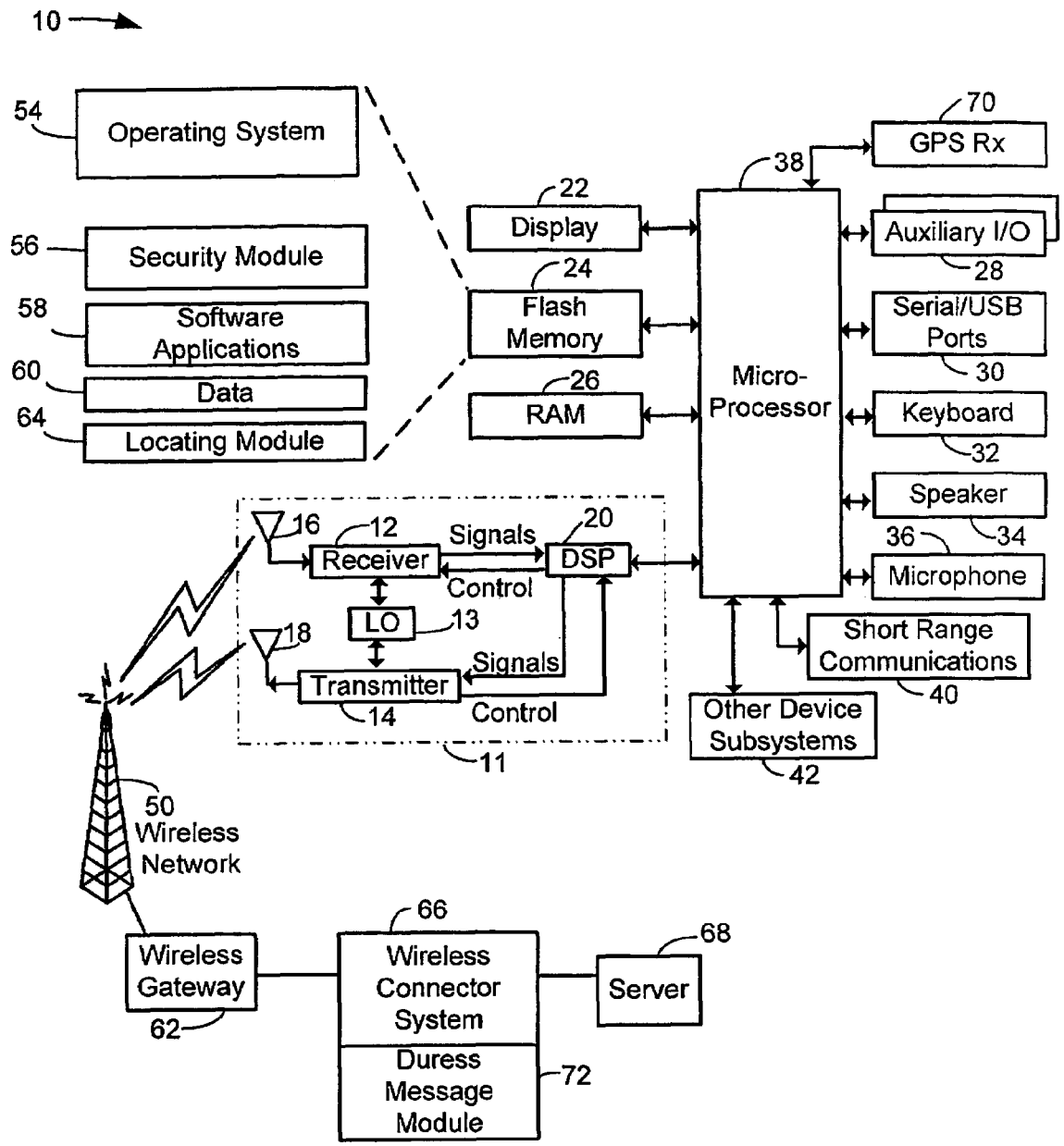
FIG. 1 is a block diagram showing a communications system including a mobile communications device to which the present invention may be applied.

Referring now to the drawings, FIG. 1 is a block diagram of a mobile communication device 10 to which the present invention is applied in an example embodiment. The mobile communication device 10 is a two-way communication device having at least data and preferably also voice communication capabilities. The device preferably has the capability to communicate with other computer systems on the Internet. Depending on the functionality provided by the device, in various embodiments the device may be a data communication device, a multiple-mode communication device configured for both data and voice communication, a mobile telephone, a PDA (personal digital assistant) enabled for wireless communication, or a computer system with a wireless modem, among other things.

The device includes a communication subsystem 11, including a receiver 12, a transmitter 14, and associated components such as one or more, preferably embedded or internal, antenna elements 16 and 18, one or more local oscillators (LOs) 13 (which may be shared with microprocessor 38), and a processing module such as a digital signal processor (DSP) 20. Signals received by the antenna 16 through a wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 50 via the antenna 18. As will be apparent to those skilled in the field of communications, the particular design of the communication subsystem 11 will be dependent upon the communication network in which the device is intended to operate, and system 11 can in various embodiments be configured differently from that describe above.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28, serial and/or USB port(s) 30, keyboard or keypad 32, speaker 34, microphone 36, a short-range communications subsystem 40, a global Positioning System receiver (GPS Rx) 70 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile storage element such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on the device 10 during manufacture. Further applications may also be loaded onto the device 10 through the network 50, an auxiliary I/O subsystem 28, serial and/or USB port(s) 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

Serial and/or USB port(s) 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth® communication module to provide for communication with similarly enabled systems and devices. The device 10 may be a handheld device.

In some example embodiments, the device 10 includes a GPS receiver 70 for receiving location information from GPS satellites, thus enabling the device 10 to track its location.

In an example embodiment, wireless gateway 62 is adapted to route data packets received from a mobile communication device 10 over wireless mobile network 50 to a destination electronic mail messaging or Internet access server 68 through a wireless connector system 66, and to route data packets received from the server 68 through the wireless connector system 66 over the wireless mobile network 50 to a destination mobile communications device. Wireless mobile network 50 is, in an example embodiment, a wireless packet data network, (e.g. Mobitex™ or DataTAC™), which provides radio coverage to mobile devices 10. Among other things, wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

Depending on the type of wireless network 50, it may be necessary to route data packets between a TCP connection to wireless gateway 62 and an X.25 or IP address mobile network connection and vice versa using an intermediary routing mechanism between the wireless gateway 62 and the wireless network 50 that provides TCP clients access to an X.25 connection. As is conventionally known, such a wireless mechanism could use, among other things, NET ID (DataTAC) or FST MAN (Mobitex) to connect to wireless mobile network 50.

Wireless gateway 62 forms a connection or bridge between the servers and wireless networks associated with wireless e-mail communication and/or Internet access. Specifically, wireless gateway 62 is coupled between wireless network 50 and the hardwired data network that includes wireless connector system 66 and destination electronic mail server 68. In an example embodiment, the wireless gateway 62 stores system configuration information, system state data, and tables that store mobile device 10 information, and also includes wireless transport modules that interface between mobile devices 10 and wireless gateway 62. The wireless transport module communicates with wireless mobile network 50 using the intermediary routing mechanism discussed above (that provides TCP clients access to an X.25 or UDP connection) and assembles data packets being received from mobile device 10 over wireless mobile network 50. Once data packets are assembled, they are sent to the upper layer of the wireless transport module for processing through wireless gateway 62 to wireless connection system 66 and eventually to destination electronic mail server 68. Wireless connector system 66 is part of the wired, backbone network and is coupled to wireless gateway 62. Wireless connector system 66 communicates with wireless gateway 62 and each electronic message server that connects to wireless gateway as a unique address. Mail server 68 is coupled to wireless connector system 66 and, in one embodiment, is a conventional electronic mail server.

The mobile device 10 stores data 60 in an erasable persistent memory, which in one example embodiment is flash memory 24. In various embodiments, the data 60 includes service data, namely the information required by the mobile device to establish and maintain communications with the wireless communications network 50 (wireless network service data) and the wireless gateway 62 (gateway service data). The data 60 may also include, among other things, user application data such as email messages, address book and contact information, calendar and schedule information, notepad documents, image files, and other commonly stored user information stored on the device 10 by its user. The data 60 may also include data required for the communications layers managed by the wireless connector system 64 and servers 68. The data 60 will often include critical data that the user of device (or others) does not want to be accessed in the event that the device 10 should fall into the hands of an unauthorized party.

In an example embodiment, among the software applications resident on the device 10 is a location module 64 that includes instructions for determining and storing location information about the device 10 based on information received from GPS receiver 70. In some embodiments, the location module 64 may not be present, or may rely on information received from transmitters in the wireless network 50 rather than from a GPS receiver.

In order provide security for the person using the mobile device 10, and for data stored on the device 10, the device includes a security module 56, which in one example embodiment is a specialized software application. In other embodiments the security module 56 may be part of the operating system 54 of may be part of another specialized software application 58. The security module 56 includes instructions for configuring the microprocessor 38 to cause the device 10 to carry out security process 200 that is shown in FIG. 2.

With reference to FIG. 2, security process 200, in one example embodiment, executes a background monitoring loop during which user inputs to the device 10 are monitored for initiation of a duress alarm, as indicated in step 204. In example embodiment, inputs from the keyboard 32 and/or an auxiliary input device such as a thumb wheel are monitored in sub-process 204 to determine if a predetermined "user duress" or security entry is made. For example, in one embodiment simultaneous activation of a predetermined two key combination (for example, depression of a control key together with a predetermined alphanumeric input key) serves as the "user duress" entry. Thus, only a single input step on the part of the user, the simultaneous depression of two keys, is required to trigger process 200. In some embodiments, a specific duress key is included in the keyboard that has no other function other than to signal a user duress or security entry either when activated on its own, or in some embodiments, in combination with one or more other user inputs. In some embodiments, the predetermined key combination required to indicate a duress situation is user configurable to reduce the chance of unauthorized or unintentional activation.

Mobile device 10 may include a lock-out function or mode such the keyboard will lock up on the command of the user or after a predetermined duration of inactivity, thereafter requiring user entry of a password to unlock the keyboard. In an example embodiment of the present invention, duress alarm monitoring process 204 runs substantially all the time that the device 10 is on, and continues monitoring for the predetermined user duress entry regardless of any keyboard lock-out that may be in effect.

The monitoring process 204 continues until input of the "user duress" entry is detected, thereby initiating a duress alarm state at the device 10. Upon initiation of a duress alarm state, as indicated at step 206, the device 10 immediately transmits a duress message 208 to wireless network 50. The duress message includes a unique identifier (Device ID) for the device 10, and a flag or other indicator that identifies the duress message as such. The duress flag and Device ID are included in packet header information of a packet sent by the device 10 in one example embodiment.

In an example embodiment, the duress message 74 also includes device location information. For example, in the case of a device 10 that is equipped with a GPS receiver 70, the duress message 74 includes current device location information based on satellite signals received by the device. In non-GPS receiver equipped devices, the location information could include ID information identifying the current transmitter/receiver in wireless network 50 that the device 10 is communicating with, such that the location of the device can be narrowed down to a cell location in wireless network 50. In some embodiments, the location information could include ID information and signal strength information about received signals from at least two transmitters in wireless network 50, such that triangulation algorithms could be used to narrow down the possible locations of the device 10. In some example embodiments, the duress message 74 sent by the wireless device 10 contains no device location information. In some embodiments, the wireless device 10 caches or stores at least its current location information so that if it loses GPS contact (in the case of GPS equipped device), information about its last known location can still be transmitted.

As indicated in step 210, in addition to sending a duress message, the security module 56 wipes all or selected parts of the data 60 that is stored in the device's 10 persistent and volatile storage. In one example embodiment, service data required to establish and maintain communication between the device 10 and wireless network 50 is permanently erased, effectively disabling the communications ability of the mobile device 10. In some embodiments where the device includes a wireless phone, 911 emergency service may be exclusively maintained. The service data required to establish and maintain communications through the wireless gateway 62 is, in various embodiments, also or alternatively deleted. In various embodiments, in addition to or instead of service data, selected portions of all of the other data on the mobile device 10, including the user application data such as stored e-mail messages, contact and address book lists, calendar and scheduling information, notepad documents, image and text files and/or other user information is permanently erased from the storage of mobile device 10. Thus, in step 210, in various embodiments, information required by the device 10 to function as a communications device is deleted, and any text or other information that may be confidential to the user is deleted, thereby removing, among other things, information from the device 10 that could be used by others to electronically impersonate the authorised user of the device 10. In some embodiments, a device wipe includes writing either zeros or ones to all or substantially all of the writable memory, both persistent and volatile, of the device 10 that is used to store application or service data.

In various embodiments, instead of deleting data, the data protection action could include encrypting all or selected portions of the data, rendering such data temporarily unusable. In such embodiments, the device 10 has a locally installed encryption engine, and an encryption key stored in the persistent memory of the device is used for the encryption. During or after the encryption process, the encryption key is either deleted or encrypted to protect it. Once encrypted, a decryption key must be obtained from a secure third party source (for example, the operator of the wireless network 50 and/or the wireless gateway 62) to decrypt the data. In some example embodiments, the device 10 includes user configurable settings that allow the user to specify, during setup or configuration of the security module, whether data is to be deleted or encrypted upon entry of the duress input. In some example embodiments, the user is given the option after entering the duress input to select between encryption or deletion of data, with the device automatically selecting a predetermined one of the two options if the user does not make a selection within an allotted selection time.

As indicated in FIG. 3, in another example embodiment of the invention, the process 200 includes an additional step or sub-process 205 between steps 204 and 206. In step 205, the user is given the opportunity for a predetermined duration to override the duress alarm by providing a predetermined user input to the device 10. Such a feature allows the user the opportunity to retract a mistakenly entered duress alert, or to stop the remainder of process 200 in the event that the user reconsiders the situation and determines that sending of a duress signal is not necessary. For example, in step 205, in one example embodiment, the security process waits a predetermined number of seconds for entry of predetermined override password and if the password is entered within the duration, then the remainder of the security process is aborted and the process returns to monitoring step 204. If the correct password is not entered during the predetermined duration then the process continues with step 206. The time duration provided for override in step 205 may be user configurable in some embodiments.

In one embodiment, the duress message 74 that is sent by the mobile device 10 is directed to the wireless connector system 66, which includes a computer-implemented duress message module 72 for performing process 400 as shown in FIG. 4. As indicated in step 402, the duress message module 72 receives, through wireless network 50 and wireless connector system 66, any duress messages coming from any mobile device 10 in communication with the wireless network 50. In an example embodiment, the duress flag or other duress message identifier is in header information of the duress message 74, and the security module 66 includes a trap such as an SNMP (Simple Network Management Protocol) trap at the wireless connector system 66 for capturing all messages having the duress flag or duress message identifier. In some embodiments, the duress message module 72 could have an address associated with it and the mobile device 10 could address the duress message 74 to such address.

As indicated at step 404, upon receiving or otherwise detecting a duress message 74, the duress message module 72 will generate a duress alert. In one example embodiment, the duress alert step or sub-process 404 includes sending an alert email message 78 through mail server 68 to a predetermined e-mail address or e-mail distribution group. In addition to or instead of an alert email 78, an instant or pop-up message 80 (sent for example through MS Windows Messaging™ facility) could be sent to a predetermined address or group of addresses. The email alert message 78 and/or instant message 80 include in example embodiments identification information about the mobile device 10 from which the duress message 74 originated, a time associated with the duress message, and, when available, any location information that was included in the duress message 74. In some embodiments, the duress message module 72 may process location information included in the duress message 74 prior to sending such location information in an email alert message 78 or instant message 80—for example, where the location information included in the duress message includes signal strength and/or identification information for one or more transmitters in the wireless network with which the mobile device 10 was communicating with, such information may be processed to determine a probable location area of the mobile device 10 that sent the duress message 74.

In various embodiments, some or all of the functions of the duress message module 72 could be performed at other components on the wired side of wireless network 50—for example, at base units or a central station of the wireless network 50, at the wireless gateway 62, or at server 68.

In one example embodiment where location information is not included in the duress message 74, a duress message flag is included in header information of the duress message 74 that is associated with the communication layer used by wireless network 50. When a receiver or the central station in the wireless network 50 detects a duress message, identification or location information about the receiver receiving the duress message 74 is inserted into or appended to the duress message 74 before it is sent on to the wireless gateway 62 and the wireless connector system. The duress message module 72 then uses such information to include location information in any alert that it sends out.

In some embodiments, the alert email 78 or message 80 may be sent to address whereby the alert email 78 or message 80 is forwarded out to one or more further mobile devices 10 in communication with the wireless network 50 such that other persons in the field can react immediately to the duress message send by one of their colleagues.

Figure 5:
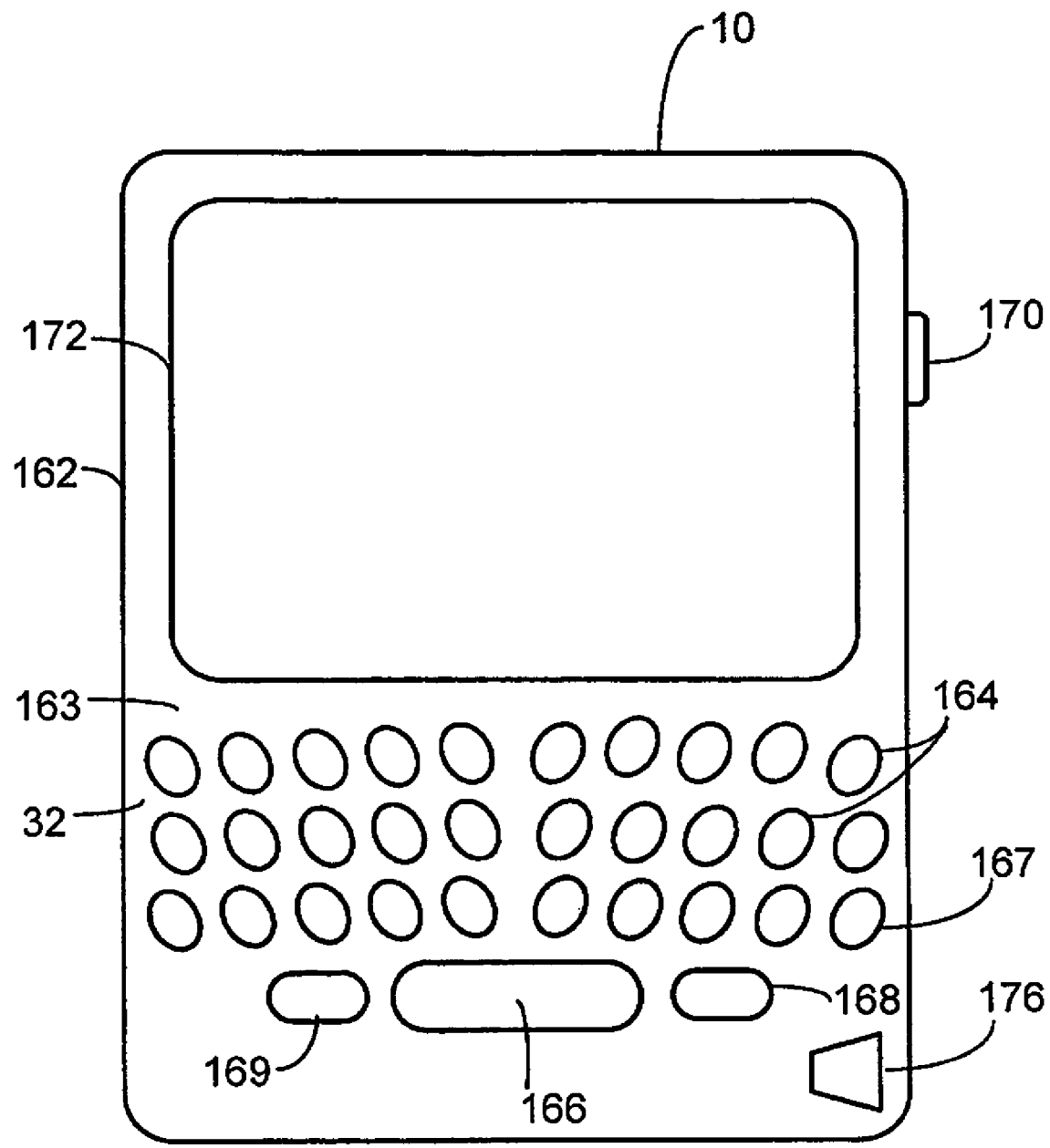
FIG. 5 is a front or plan view of a mobile communications device according to example embodiments.

With reference to FIG. 5, in an example embodiment, the components and subsystems of mobile device 10 are housed within a rigid case 162 that is configured to be held with one or two hands while the device 10 is in use. Although the case 162 is shown as a single unit in FIG. 5, it could alternatively include two or more case members hinged together. The mobile device 10 is, in various example embodiments, small enough to fit inside a standard purse or suit jacket pocket. In an example embodiment, the keyboard 32 is horizontally positioned symmetrically between a left edge and a right edge of a face 163 of the device 10. The keyboard 32 includes character input buttons or keys for user input of displayable characters, such as substantially similarly sized alphanumeric buttons or keys 164 and a larger elongated space bar button or key 166. The keyboard 32 also includes non-alphanumeric command or control buttons or keys such as line feed or enter key 167, CAP key 168 and CTRL key 169. In the example embodiment of FIG. 5, the keys on the face of device 10 are positioned to be actuated by the thumbs of the user while the back of the device 10 is supported by the fingers of the user. In one example embodiment, alphanumeric keys 164 and space bar key 166 are arranged in a QWERTY-style or Dvorak-style keyboard having the plurality of alphanumeric keys 164 arranged in a plurality of rows across the face 163 of case 162, with the elongate space bar key 166 centrally located below the last row of alphanumeric keys 164. Alternative keyboard layouts and configurations are used in other embodiments of device 10. Auxiliary I/O system 28 includes a rotate-able and push-able thumbwheel 170. The display system 22 includes an LCD display 72 housed in casing 162.

As noted above, in at least some example embodiments, the user duress input is a predetermined two-key combination. For example, the predetermined combination may be the control key 168 and a selected one of the alphanumeric keys 64, or a combination of any other two predetermined keys of keyboard 32. In some embodiments, the user duress input may be the combination of simultaneous pushing in of the thumbwheel 170 and depression of a predetermined one of the keys of keyboard 32. In some example embodiments, the keys of the predetermined key combination may need to be activated sequentially rather than simultaneously in order to signal a duress. In some embodiments, the duress key combination may include more than two keys. In some embodiments, a special duress key, for example key 176, may be included in keyboard 32—the device 10 can be configured in various embodiments such that special duress key 176 needs to be activated in combination with one or more other keys and/or thumbwheel 70, or alone, to signal a duress.

It will thus be appreciated that the above described embodiments permit the user of a mobile device 10 to quickly and discreetly send out a duress alert and also protect critical data stored on the mobile device. In some applications, step 210 of wiping data from the device may be omitted from process 200, and in some applications step 206 of sending a duress alarm may be omitted.

Figure 6:
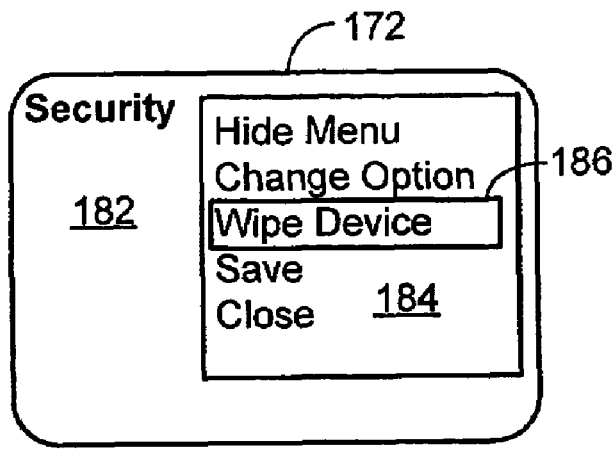
FIG. 6 shows a representation of a user interface screen display according to example embodiments.
Figure 7:
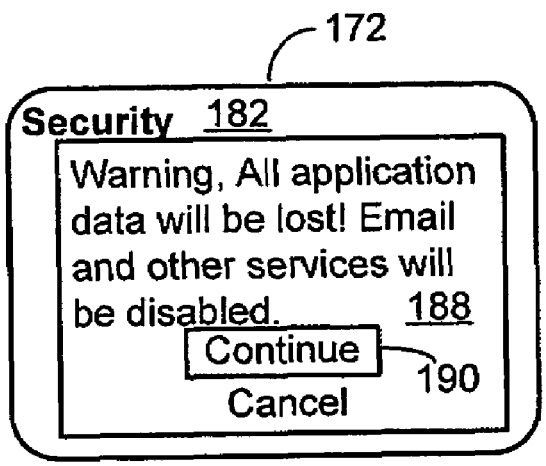
FIG. 7 shows a representation of a further user interface screen display.
Figure 8:
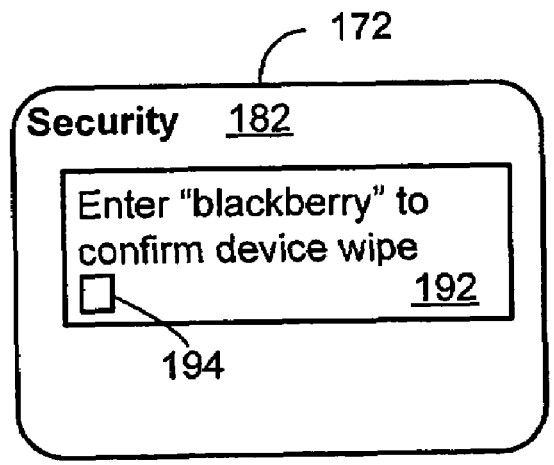
FIG. 8 shows a further representation of a further user interface screen display.

In another example embodiment of the invention, the user duress or security input required to erase the device requires multiple sequential steps. Such a configuration provides reduced protection speed than a one step activated wiping process as more time is required to initiate the wipe process, but reduces the chance of an accidental data wipe. By way of example, FIGS. 6, 7 and 8 show examples of user interface display screens generated by the security module 56 on display screen 172 of the device according to another example embodiment of the invention. In the embodiment of FIGS. 6, 7 and 8, the user can access a security user interface 182 from a main menu screen, and update security-related settings for the device 10 through the security user interface 182.

As shown in FIG. 6, in an example embodiment, the security user interface 182 displays a first window 184 that includes a ribbon of selectable items through which the user can navigate a selection or focus indicator 186 by scrolling thumbwheel 170. Among the selectable items is a "Wipe Device" option, as highlighted by focus indicator 186 in FIG. 6. If the user presses the thumbwheel 170 or makes another predetermined selection input when the "Wipe Device" option is highlighted by focus indicator 186, a warning window 188 appears, as shown in FIG. 7. The warning window 188 includes a warning such as "Warning, All application data will be lost! Email and other services will be disabled" or the like. The warning window 188 includes selectable "Continue" and "Cancel" buttons which can be high-lighted with a focus indicator 190 that is responsive to rotation of thumbwheel 170, with pressing of the thumbwheel or another predetermined selection input selecting the highlighted button. If the user selects "Cancel", the security process is terminated. If, however, the user selects "Continue" then, as shown in FIG. 8, a third window 192 is displayed on screen 172. The third window 192 includes instructions to the user to enter a predetermined word in order to confirm the device wipe, and includes a text entry cursor 194 to provide visual feedback as the selected word is typed in by the user using keyboard 32. Once the word is typed in and the user presses the enter key 167, wipe data step 210 of process 200 is executed. For example, in one embodiment all or substantially all service data and user application data stored on the device 10 is overwritten, rendering the device 10 useless for further communications and removing any potentially sensitive user data therefrom. In some embodiments, similar steps could be used to initiate data encryption rather than a complete deletion.

Turning again to FIG. 8, if the user does not enter the predetermined word within a specified time period, the process is terminated without wiping the data. The steps described above with reference to FIGS. 6 to 8 could also be used to initiate sending of a duress message instead of or in addition to wiping data on the device 10. Although FIG. 8 shows the predetermined word "blackberry" displayed on the screen, the word could instead be a shared secret that is not displayed, in order to reduce the chance of an unauthorized wipe. It will be appreciated that the multi-step activation process could be varied in a number of ways. For example, the intermediate confirmation window 188 could be omitted, or the third window 192 omitted. In some embodiments, the third window 192 and/or the conformation window 188 are displayed after the user presses a predetermined two key combination, or a dedicated duress button.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A mobile electronic device, comprising:
    a processor;
    a user input device connected to the processor for sending signals to the processor;
    a display screen connected to the processor;
    a communication sub-system connected to the processor for exchanging signals with a wireless network and with the processor;
    a plurality of application modules associated with the processor for implementing applications on the mobile electronic device;
    a storage element connected to the processor and having data stored thereon, the data comprising at least service data required to establish communications with the wireless network and user application data associated with the application modules; and
    a security module associated with the processor for displaying on the display screen a plurality of selectable items upon detecting a predetermined security input through the user input device, displaying on the display screen a window comprising a prompt for further input in response to an input selecting a predetermined one of the selectable items, and performing a security action comprising deleting or encrypting all service data and/or all user application data stored on the storage element while maintaining other data stored on the storage element subsequent to a further input in response to the prompt,
    wherein the security module is configured for entry of a predetermined word and to perform the security action only if the predetermined word is correctly entered subsequent to displaying the prompt for a further input, and
    wherein the security module is configured to display as part of the prompt the predetermined word prior to entry of the predetermined word.

2. The mobile electronic device of claim 1, comprising a rigid case configured to be hand held and housing the processor, the user input device, the display screen and the storage element, the user input device comprising a thumbwheel responsive to user manipulation for controlling movement of an on-screen selection indicator among the plurality of selectable items and selecting the predetermined one of the selectable items.

3. The mobile electronic device of claim 1, wherein the user input device comprises a plurality of input keys, and the security module is configured to display the plurality of selectable items upon user depression of a predetermined two or more key combination.

4. The mobile electronic device of claim 1 wherein the user input device comprises a dedicated input key, and the security module is configured to display the plurality of selectable items item upon user depression of the dedicated input key.

5. The mobile electronic device of claim 1, wherein the security action comprises encrypting the service data and/or user application data stored in the storage element, and wherein the security module is configured to delete or encrypt an encryption key stored in the storage element after encrypting the service data and/or user application data stored in the storage element.

6. The mobile electronic device of claim 1, wherein the security action comprises erasing all service data while maintaining all user application data stored on the storage element.

7. The mobile electronic device of claim 1, wherein the security action comprises erasing all service data and user application data stored on the storage element while maintaining other data stored on the storage element.

8. The mobile electronic device of claim 1, wherein the service data comprises data required to establish communications with a wireless gateway connected to the wireless network.

9. The mobile electronic device of claim 1, wherein the security module is configured to perform the security action only if the predetermined word is entered within a specified time period subsequent to receiving the prompt for a further input.

10. A method of providing security for data stored on a wireless communications device, the wireless communications device comprising a processor and a storage element connected to the processor and having data stored thereon, the data comprising at least service data required to establish communications with a wireless network and user application data associated with the application modules or implementing applications on the wireless communications device, the method comprising the steps of:

displaying a list of selectable items on a display screen of the wireless communications device upon detecting a predetermined security input through an user input device;

providing the wireless communications device with an input device enabling movement of a selection indicator among the items of the displayed list;

in response to a selection of a predetermined one of the selectable items, displaying on the display screen a window comprising a prompt for a further input; and subsequent to a further input in response to the prompt, performing a security action comprising deleting or encrypting all service data and/or all user application data stored on the storage element while maintaining other data stored on the storage element, subsequent to receiving the further input, displaying on the display screen a further window comprising a prompt for yet a further input, wherein the security action is performed only if the yet further input is received through the input device subsequent to receiving the prompt for yet a further input, and wherein the further window comprises a word and instructions to enter the word as the yet further input to proceed with the security action.

11. The method of claim 10, wherein the window comprises displayed selectable options of continuing with the security action or cancelling the security action.

12. The method of claim 10, wherein the input device is provided as a thumbwheel responsive to manipulation for controlling movement of the selection indicator among the plurality of selectable items for selecting the predetermined one of the selectable items.

13. The method of claim 10, wherein the user input device comprises a plurality of input keys for inputting characters.

14. The method of any one claim 10, wherein the security action comprises encrypting the service data and/or user application data stored in the storage element, and wherein the security module deletes or encrypts an encryption key stored in the storage element after encrypting the service data and/or user application data stored in the storage element.

15. The method of claim 10, wherein the security action comprises erasing all service data while maintaining all user application data stored on the storage element.

16. The method of claim 10, wherein the security action comprises erasing all service data and user application data stored on the storage element while maintaining other data stored on the storage element.

17. The method of claim 10, wherein the service data comprises data required to establish communications with a wireless gateway connected to the wireless network.

18. The method of claim 10, wherein the security action is performed only if the yet further user input is received through the input device within a specified time period subsequent to receiving the prompt for yet a further user input.

* * * * *

UNITED STATES PATENT AND TRADEMARK OFFICE
CERTIFICATE OF CORRECTION

PATENT NO. : 7,720,461 B2 Page 1 of 1
APPLICATION NO. : 10/787859
DATED : May 18, 2010
INVENTOR(S) : David Thornton, Neil Adams and Herb Little It is certified that error appears in the above-identified patent and that said Letters Patent is hereby corrected as shown below:

Col. 11, Claim 2, Line 1, please delete "user".

Col. 11, Claim 3, Line 9, please delete "user".

Col. 11, Claim 4, Line 14, please delete "item" and "user".

Col. 11, Claim 10, Line 47, please delete "the steps of".

Col. 12, Claim 14, Line 31, please delete "any one".

Signed and Sealed this

Tenth Day of August, 2010

David J. Kappos
*Director of the United States Patent and Trademark Office*